United States Patent [19]

Colella et al.

[11] Patent Number: 5,344,878
[45] Date of Patent: Sep. 6, 1994

[54] HIGHLY TRANSPARENT TOUGH POLYMER BLENDS

[75] Inventors: Michael Colella, Plantsville, Conn.; Brian Marcoulier, Fitchburg, Mass.

[73] Assignee: Novacor Chemicals (International) S.A., Fribourg, Switzerland

[21] Appl. No.: 25,606

[22] Filed: Mar. 3, 1993

[51] Int. Cl.⁵ .................. C08L 51/04; C08L 25/14
[52] U.S. Cl. ........................... 525/84; 525/70; 525/71; 525/83; 525/316; 525/302
[58] Field of Search .............. 525/71, 70, 83, 84, 525/316

[56] References Cited

U.S. PATENT DOCUMENTS

| | | | |
|---|---|---|---|
| 4,607,080 | 8/1986 | Yosa et al. | 525/84 |
| 4,647,620 | 3/1987 | Doak | 525/71 |
| 4,652,614 | 3/1987 | Eichenauer et al. | 525/71 |
| 5,079,296 | 1/1992 | Thompson et al. | 525/71 |

Primary Examiner—James J. Seidleck
Assistant Examiner—Mark L. Warzel
Attorney, Agent, or Firm—Bruce E. Harang

[57] ABSTRACT

There is a demand for very clear tough polymers or polymer blends, particularly in the packaging industry. Crystal polystyrene is clear but lacks toughness. HIPS is tough but lacks the required clarity. Blends of styrene-ester polymers with a very small amount of HIPS do provide a very clear tough polymer alloy.

5 Claims, 1 Drawing Sheet

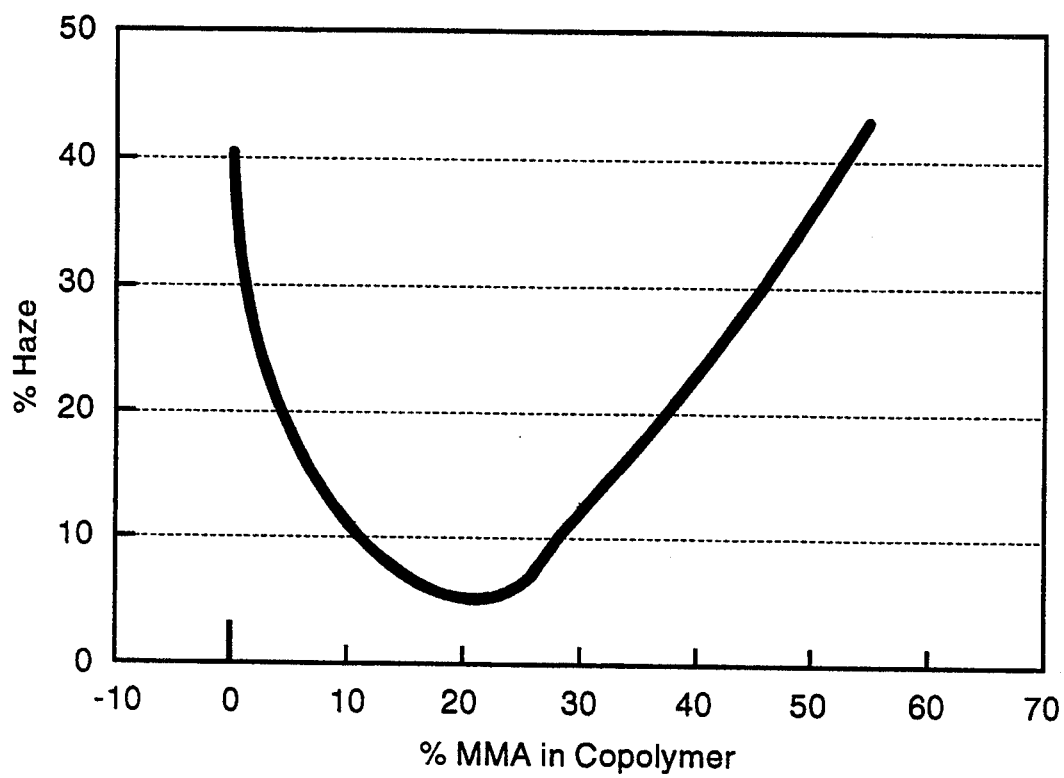

5,344,878

HIGHLY TRANSPARENT TOUGH POLYMER BLENDS

FIELD OF THE INVENTION

The present invention relates to clear, toughened blends having a low haze. These blends are useful in household articles and rigid packaging such as containers or boxes.

BACKGROUND OF THE INVENTION

General purpose or crystal polystyrene is used in a number of applications, including household and rigid packaging, where clarity or translucency is required. While general purpose polystyrene is suitable for such applications, it has a fairly low toughness. That is, it has low impact resistance. This drawback can be overcome by incorporating rubber into the polystyrene but it results in a loss of clarity or increasing haze.

U.S. Pat. No. 5,079,296, issued Jan. 7, 1992 to the assignee herein, discloses clear tough alloys. However, to obtain the combination of clarity and toughness, it is necessary to use a three component system, namely:
(i) a brittle polymer which is a clear thermoplastic;
(ii) a block copolymer (typically K resin ®); and
(iii) an impact modified polymer (e.g. HIPS).

The K resin ® is a relatively expensive component in the above blend. Applicants have discovered a blend having high clarity and good toughness while eliminating an essential component of the 296 patent.

There is a need for a relatively tough, clear polymer blend.

SUMMARY OF THE INVENTION

The present invention provides a polymer blend comprising:
(i) from 95 to 99.5, preferably from 99 to 97, weight % of a copolymer comprising:
  (a) from 70 to 90 weight % of one or more $C_8$-vinyl aromatic monomers which are unsubstituted or substituted by a $C_{1-4}$ alkyl radical; and
  (b) from 30 to 10 weight % of one or more monomers selected from the group consisting of $C_{1-4}$ alkyl esters of $C_{3-6}$ ethylenically unsaturated carboxylic acids; and
(ii) from 5 to 0.5, preferably from 3 to 1, weight % of an impact modified polymer comprising:
  (a) from 4 to 15 weight % of a rubbery polymer selected from the group consisting of:
    (i) co- and homopolymers of one or more $C_{4-6}$ conjugated diolefins; and
    (ii) copolymers comprising:
      (A) from 60 to 80 weight % of one or more $C_{4-6}$ conjugated diolefins; and
      (B) from 40 to 20 weight % of one or more $C_{8-12}$ vinyl aromatic monomers which are unsubstituted or substituted by a $C_{1-4}$ alkyl radical,
  to which has been grafted at least a portion of:
  (b) from 85 to 96 weight % of a polymer prepared by polymerizing a monomer mixture comprising:
    (i) from 100 to 70 weight % of one or more $C_{8-12}$ vinyl aromatic monomers which are unsubstituted or substituted by a $C_{1-4}$ alkyl radical; and
    (ii) from 0 to 30 weight % of one or more $C_{1-4}$ alkyl esters of a $C_{3-6}$ ethylenically unsaturated carboxylic acid.

The present invention also provides a rigid container having a haze of less than 15%, preferably less than 10%, most preferably less than 8%, made from the compositions of the present invention.

BRIEF DESCRIPTION OF THE DRAWINGS

FIG. 1 is a plot of the haze as a function of the methyl methacrylate content in an alloy of a copolymer of styrene and methyl methacrylate containing 1.6% of high impact polystyrene.

DETAILED DESCRIPTION

In accordance with the present invention the first component in the blend is a styrene ester polymer. The polymer is present in an amount from 95 to 99.5, preferably from 97 to 99 weight %.

Suitable polymers comprise:
(a) from 70 to 90, preferably from 75 to 80, weight % of one or more $C_{8-12}$ vinyl aromatic monomers which are unsubstituted or substituted by a $C_{1-4}$ alkyl radical; and
(b) from 30 to 10, preferably from 25 to 20, weight % of one or more $C_{1-4}$ alkyl esters of $C_{3-6}$ ethylenically unsaturated carboxylic acids.

Vinyl aromatic monomers suitable for use in component (i) include styrene, alpha-methyl styrene, t-butyl styrene, and p-methyl styrene. Styrene is a particularly preferred monomer for use in the polymers of component (i) of the present invention.

In component (i) $C_{1-4}$ alkyl esters of $C_{3-6}$ ethylenically unsaturated carboxylic acids acid include acrylate monomers such as methyl methacrylate, ethyl methacrylate, methyl acrylate, ethyl acrylate and butyl acrylate. Particularly preferred monomers are the methacrylate monomers including methyl methacrylate and ethyl methacrylate.

In accordance with the present invention, the styrene ester polymer is blended with a small amount of an impact or rubber modified polymer. The impact or rubber modified polymer may be a co- or homo- polymer of polybutadiene onto which has been grafted at least a portion of a homopolymer or copolymer of one or more vinyl aromatic monomer(s) or a styrenic ester copolymer.

The rubber in the impact or rubber modified polymer may be a homo- or co- polymer of one or more $C_{4-6}$ conjugated diolefins, preferably butadiene. If the rubbery polymer is a homopolymer, it may have a steric configuration. Some impact modified polymers incorporate high cis polybutadiene. That is, polybutadiene having not less than about 95, preferably greater than 98% of the polymer in the cis configuration. Such polymers are commercially available from the Polysar Rubber Corporation under the trade mark TAKTENE. Some impact modified polymers incorporate medium cis polybutadiene. That is, polymers having from about 50 to 60, preferably 55 weight % of the polymer in the cis configuration. Such rubbers are commercially available from the Polysar Rubber Corporation and Firestone under the trade marks TAKTENE and DIENE, respectively.

The rubber in the impact or rubber modified polymer may be a copolymer comprising from 60 to 80 weight % of one or more $C_{4-6}$ conjugated diolefins and from 40 to 20 weight % of one or more $C_{8-12}$ vinyl aromatic monomers which are unsubstituted or substituted by a $C_{1-4}$ alkyl radical. Such rubbers are known as SBR rubbers and are commercially available from a number of sources.

Useful conjugated diolefins include butadiene. Useful vinyl aromatic monomers have been listed above.

The rubbery polymer forms from 4 to 15, most preferably from 4 to 10 weight % of the impact or rubber modified polymer. The rubber is dispersed through a continuous matrix of clear rigid thermoplastic. Typically, such polymers are prepared by "dissolving" the rubber in the monomers which are polymerized to form the plastic. During the initial stages of polymerization, the rubber forms the continuous phase and the monomer/thermoplastic polymer forms the discontinuous phase. Early in the polymerization, the system inverts and the rubber forms the discontinuous phase and the monomer/thermoplastic phase forms the continuous phase. When the system under goes phase inversion, the dispersed rubber phase is not homogeneous. That is, usually the rubber phase has occluded monomer and thermoplastic resin within it (e.g. the rubber forms a boundary layer encompassing monomer and thermoplastic). In any event, some of the monomer is grafted to the rubber. Of course, not all the thermoplastic is grafted to the rubber but only a portion of it. Typically, under free radical initiation (the best condition for grafting), about half of the rubber is grafted. Thus graft levels are less than 5, typically from about 1 to 3% of the thermoplastic.

The continuous resin phase or matrix of the impact or rubber modified polymer forms from 96 to 85, preferably from 94 to 90 weight % of the impact or rubber modified polymer. The resin phase or matrix may be a polymer prepared by polymerizing a monomer mixture comprising:
(i) from 100 to 70 weight % of one or more $C_{8-12}$ vinyl aromatic monomers which are unsubstituted or substituted by a $C_{1-4}$ alkyl radical; and
(ii) from 0 to 30 weight % of one or more $C_{1-4}$ alkyl esters of a $C_{3-6}$ ethylenically unsaturated carboxylic acid.

If the resin which forms the continuous or matrix phase of the impact or rubber modified polymer is a homopolymer, it is preferably a homopolymer of styrene, alpha-methyl styrene, p-methyl styrene, or t-butyl styrene; most preferably styrene. The resulting polymer would most preferably be high impact polystyrene (HIPS) or homologues of HIPS based on the other preferred monomers.

If the resin which forms the continuous or matrix phase of the impact or rubber modified polymer is a copolymer, the preferred vinyl aromatic monomers are styrene, alpha-methyl styrene, p-methyl styrene, or t-butyl styrene, most preferably styrene; and the preferred ester monomers are methyl methacrylate and ethyl methacrylate.

In preparing the polymer blends of the present invention, adequate mixing of the components can be achieved by mechanical mixing in a suitable intensive mixer, preferably an extruder. Operation of an extruder to achieve this end is within the purview of a person skilled in the art. For example, for an inch and a half extruder having an L to D ratio of about 24:1, the extruder is operated at from 30 to 150, preferably from 50 to 135, most preferably from 75 to 100, RPM. During such operation, the barrel temperature of the extruder is in the range of from 190° to 240° C., preferably from 200° to 220° C.

The components of the blends of the present invention may be dry blended in, for example, a tumble blender. The resulting blend may then be extruded. In an alternative procedure, the polymers may be fed directly to an extruder which provides good mixing.

Embodiments of the invention will be illustrated with reference to the following examples which should not be construed so as to limit the scope of the present invention. In the examples, unless otherwise specified, parts is parts by weight (g), and per cent is weight %.

MATERIALS

In the examples, the following materials were used. Crystal polystyrene (Crystal) was one of the comparative materials. It is a homopolymer of styrene. Two types of impact polystyrene containing two different levels of polybutadiene, about 8% and 4%, high impact polystyrene (HIPS) and medium impact polystyrene (MIPS)), were used. The copolymers used were copolymers of styrene and methyl methacrylate. The styrene content in the copolymers was about 90%, 80%, 70%, and 45% (Copolymer I, II, III, and IV, respectively).

The blends were prepared by dry blending the components and then passing them through laboratory extruders to prepare pellets.

TEST METHODS

The pellets of the blends and pellets of comparative materials were molded into test specimens and rigid containers. The haze of the samples was determined on injection molded plaques ⅛ of an inch thick using ASTM D-1003 (values in per cent), and the Gardner type impact strength was measured on injection molded rigid containers with a wall thickness of 0.060 inches (values in inch-pounds). The impact test was conducted with a 5/8 inch tup and a ¼ pound weight.

RESULTS

The compositions and the test results are set forth in Table 1 and FIG. 1.

TABLE 1

| COMPOSITION | HAZE (%) | IMPACT STRENGTH (IN. LBS.) |
|---|---|---|
| CRYSTAL POLYSTYRENE | 1.0 | 0.9 |
| COPOLYMER II | 0.5 | 1.4 |
| CRYSTAL + 1.6% HIPS | 40.4 | — |
| COPOLYMER I + 1.6% HIPS | 11.2 | — |
| COPOLYMER II + 1.6% HIPS | 5.4 | 3.1 |
| COPOLYMER II + 3.0% MIPS | 5.1 | — |
| COPOLYMER III + 1.6% HIPS | 12.2 | — |
| COPOLYMER IV + 1.6% HIPS | 43.3 | — |

Table I clearly shows that the compositions of the present invention provide a low haze product which is toughened relative to crystal polystyrene and significantly clearer than crystal polystyrene modified with small amounts of HIPS. FIG. 1 is a plot of the haze as a function of the methyl methacrylate content in an alloy of a copolymer of styrene and methyl methacrylate containing 1.6% of high impact polystyrene. FIG. 1 may be used to determine the useful range of copolymer composition for obtaining adequate clarity.

What is claimed is:

1. A polymer blend consisting essentially of:
   (1) 97 to 99 weight % of a copolymer consisting essentially of:
      (a) from 70 to 90 weight % of one or more monomers selected from the group consisting of styrene, alpha-methyl styrene, p-methyl styrene, and t-butyl styrene; and
      (b) from 30 to 10 weight % of one or monomers selected from the group consisting of methyl methacrylate, ethyl methacrylate, methyl acrylate, and butyl acrylate; and
   (2) from 3 to 1 weight % of an impact modified polymer consisting essentially of:
      (a) from 4 to 15 weight % of a rubbery polymer selected from the group consisting of:
         (i) co- and homo-polymers of $C_{4-6}$ conjugated diolefins; and
         (ii) copolymers comprising:
            (A) from 60 to 80 weight % of one or more $C_{4-6}$ conjugated diolefins; and
            (B) from 40 to 20 weight % of one or more monomers selected from the group consisting of styrene, alpha-methyl styrene, p-methyl styrene, and t-butyl styrene,
      to which has been grafted at least a portion of:
      (b) from 85 to 96 weight % of a polymer prepared by polymerizing a monomer mixture comprising:
      (b) from 85 to 96 % of a polymer prepared by polymerizing a monomer mixture comprising:
         (i) from 100 to 70 weight % one or more monomers selected from the group consisting of styrene, alpha-methyl styrene, p-methyl styrene, and t-butyl styrene; and
         (ii) from 0 to 30 weight % of one or more monomers selected from the group consisting of methyl methacrylate, ethyl methacrylate, methyl acrylate, and butyl acrylate.

2. The polymer blend according to claim 1, wherein component 1 consists essentially of:
   (a) from 75 to 80 weight % of one or more monomers selected from the group consisting of styrene, alpha-methyl styrene, p-methyl styrene, and t-butyl styrene; and
   (b) from 25 to 20 weight % of one or monomers selected from the group consisting of methyl methacrylate, ethyl methacrylate, methyl acrylate, and butyl acrylate.

3. The polymer blend according to claim 2, wherein component 2 is an impact modified polymer consisting essentially of:
   (a) from 4 to 15 weight % of polybutadiene, to which has been grafted at least a portion of;
   (b) from 96 to 85 weight % of a polymer prepared by polymerizing styrene.

4. The polymer blend according to claim 3, wherein component 2 is an impact modified polymer consisting essentially of:
   (a) from 4 to 10 weight % of polybutadiene, to which has been grafted at least a portion of;
   (b) from 96 to 90 weight % of a polymer prepared by polymerizing styrene.

5. The polymer blend according to claim 4, wherein component 1 consists essentially of:
   (a) from 75 to 80 weight % of styrene; and
   (b) from 25 to 20 weight % of methyl methacrylate.

* * * * *